(12) United States Patent
Kawamoto

(10) Patent No.: US 8,768,060 B2
(45) Date of Patent: Jul. 1, 2014

(54) IMAGE PROCESSING APPARATUS, IMAGE PROCESSING METHOD AND COMPUTER-READABLE MEDIUM

(75) Inventor: Koushi Kawamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1423 days.

(21) Appl. No.: 12/117,338

(22) Filed: May 8, 2008

(65) Prior Publication Data

US 2009/0060391 A1 Mar. 5, 2009

(30) Foreign Application Priority Data

Sep. 4, 2007 (JP) ................................ 2007-229047

(51) Int. Cl.
*G06K 9/00* (2006.01)

(52) U.S. Cl.
USPC ........... 382/180; 382/179; 382/202; 382/203; 382/276; 382/317

(58) Field of Classification Search
USPC .................. 382/179–189, 202, 203, 276, 317
See application file for complete search history.

(56) References Cited

U.S. PATENT DOCUMENTS

| 5,926,186 A | 7/1999 | Itoh et al. |
| 6,075,539 A | 6/2000 | Ishida et al. |
| 6,999,622 B2 * | 2/2006 | Komatsu ........................ 382/202 |
| 2001/0036318 A1 * | 11/2001 | Komatsu ........................ 382/202 |
| 2007/0074109 A1 | 3/2007 | Nagahara et al. |

FOREIGN PATENT DOCUMENTS

| JP | 06020025 A | 1/1994 |
| JP | 696177 A | 4/1994 |
| JP | 10222691 A | 8/1998 |
| JP | 10228492 A | 8/1998 |
| JP | 2001-312261 A | 9/2001 |
| JP | 2007172573 A | 7/2007 |

* cited by examiner

Primary Examiner — Wesley Tucker
(74) Attorney, Agent, or Firm — Sughrue Mion, PLLC

(57) ABSTRACT

An image processing apparatus includes a storage unit, a receiving unit, a search unit, a processing unit and an output unit. The storage unit stores information of drawn image elements. The receiving unit receives a transformation instruction to transform a part of the image elements specified by the information of the image elements. The search unit searches the storage unit for an image element that (i) has a relation, being based on a predetermined condition, with the image elements, which are a target of the transformation instruction, and (ii) is not the target of the transformation instruction. The processing unit performs a transformation process on (i) the image elements, which are the target of the received transformation instruction, and (ii) the image element, which is found as the search result, based on the received transformation instruction. The output unit outputs the result of the transformation process.

26 Claims, 7 Drawing Sheets

FIG. 3

| ID | V | T |
|---|---|---|
| IMAGE ELEMENT IDENTIFIER | VECTOR INFORMATION | DATE AND TIME |
| aaaa | bbbb ⋯ | cccc |
| dddd | eeee ⋯ | ffff |
| ⋮ | ⋮ | ⋮ |

| IMAGE ELEMENT IDENTIFIER | INTERSECTION | INCLUSION | ... |
|---|---|---|---|
| 1 | 2 | 3 | ... |
| 2 | 1 | 3 | ... |
| 3 | — | — | ... |
| ⋮ | ⋮ | ⋮ | ⋮ |

US 8,768,060 B2

IMAGE PROCESSING APPARATUS, IMAGE PROCESSING METHOD AND COMPUTER-READABLE MEDIUM

CROSS-REFERENCE TO RELATED APPLICATIONS

This application is based on and claims priority under 35 U.S.C. §119 from Japanese Patent Application No. 2007-229047 filed on Sep. 4, 2007.

BACKGROUND

The invention relates to an image processing apparatus, an image processing method and a computer-readable medium.

SUMMARY

According to an aspect of the invention, an image processing apparatus includes a storage unit, a receiving unit, a search unit, a processing unit and an output unit. The storage unit stores information of a plurality of drawn image elements. The receiving unit receives a transformation instruction to transform a part of the image elements specified by the information of the plurality of image elements. The search unit searches the storage unit for an image element that (i) has a relation, being based on a predetermined condition, with the image elements, which are a target of the transformation instruction, and (ii) is not the target of the transformation instruction. The processing unit performs a transformation process on (i) the image elements, which are the target of the received transformation instruction, and (ii) the image element, which is found as the search result, based on the received transformation instruction. The output unit outputs the result of the transformation process.

BRIEF DESCRIPTION OF THE DRAWINGS

Exemplary embodiments of the invention will be described in detail below with reference to the accompanying drawings, wherein:

FIG. 3 is an explanatory diagram illustrating an example of information of image elements stored in the image processing apparatus according to the exemplary embodiment of the invention;

DETAILED DESCRIPTION

Figure 1:
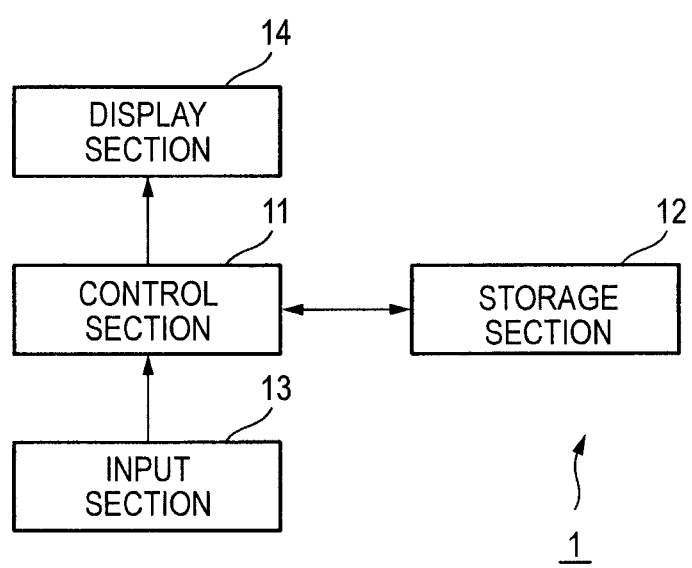
FIG. 1 is a block diagram illustrating the configuration of an image processing apparatus according to an exemplary embodiment of the invention.

Exemplary embodiments of the invention will be described with reference to the accompanying drawings. As shown in FIG. 1, an image processing apparatus 1 according to an exemplary embodiment of the invention includes a control section 11, a storage section 12, an input section 13, and a display section 14.

The control section 11 is a program control device such as a CPU (Central Processing Unit) and operates in accordance with a program stored in the storage section 12. The control section 11 receives a drawing instruction to draw an image element such as a character or a figure. The image elements, which are drawn in accordance with the drawing instructions, are stored in the storage section 12. The control section 11 also receives a transformation instruction to transform a part of the image elements and searches the storage section 12 for an image element that (i) has a relation, being based on a predetermined condition, with the image elements, which are a target of the transformation instruction, and (ii) is not the target of the transformation instruction. Then, the control section 11 performs a transformation process on (i) the image elements, which are the target of the transformation instruction, and (ii) the image element, which is found as the search result, and outputs the transformation result. The detailed processes of the control section 11 will be described later.

The storage section 12 includes a storage device such as a RAM (Random Access Memory) and/or a hard disk. The storage section 12 stores programs to be executed by the control section 11. The programs may be provided in a state where they are stored in a memory medium such as a DVD-ROM and may be copied to the storage section 12. Information of the image elements, which are drawn based on the drawing instruction(s) received by the control section 11, is stored in the storage section 12.

The input section 13 may include a mouse and a keyboard and may further include a tablet. The input section 13 receives a user's instruction and outputs the received instruction to the control section 11. For example, the input section 13 outputs information of figures drawn on the tablet to the control section 11.

The display section 14 includes a display device and displays a variety of information such as the image elements in response to the instruction input from the control section 11. The display device may be disposed so as to enable a user to recognize displayed contents through the tablet of the input section 13.

Figure 2:
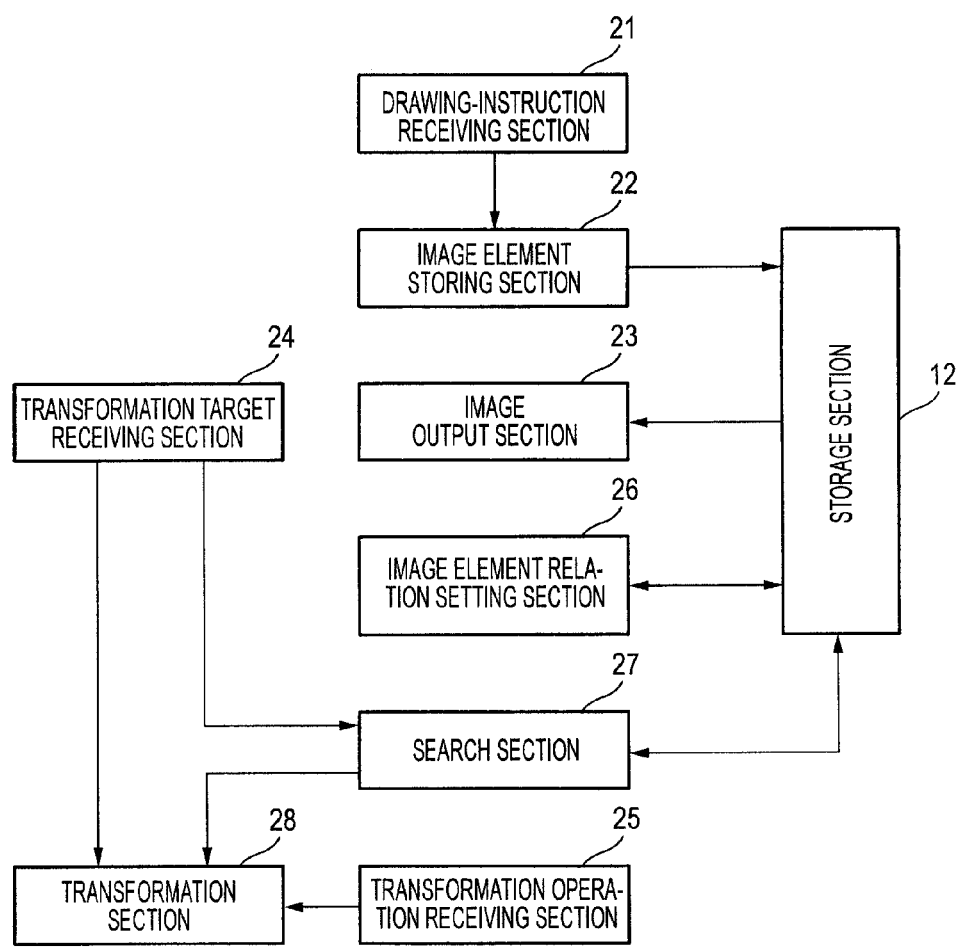
FIG. 2 is a functional block diagram illustrating an example of the image processing apparatus according to the exemplary embodiment of the invention.

Details of the processes performed by the control section 11 are described below. As shown in FIG. 2, the control section 11 functionally includes a drawing-instruction receiving section 21, an image-element storing section 22, an image output section 23, a transformation-target receiving section 24, a transformation operation receiving section 25, an image element relation setting section 26, a search section 27, and a transformation processing section 28.

The drawing-instruction receiving section 21 receives a drawing instruction to draw a character (characters) and/or a figure (figures) in accordance with an input operation performed by a user through the input section 13. For example, the drawing-instruction receiving section 21 receives a drawing instruction to draw a character string, which is input through the keyboard, at coordinates that are designated using the tablet or the mouse by the user. The drawing-instruction receiving section 21 receives a drawing instruction to draw a figure (figures) such as a circle, a rectangle, and a manually drawn line in accordance with an operation of the mouse and/or the tablet.

The image-element storing section 22 generates a unique identifier (image element identifier) based on the drawing instruction received by the drawing-instruction receiving section 21. The image element storing section 22 generates information of the image element based on the drawing instruction and stores the information of the image element and the image element identifier in the storage section 12 in association with each other. For example, the information of the image element may be vector information (a group of coordinate information) for specifying a figure (figures) to be drawn in accordance with the drawing instruction. The technology of generating the vector information for drawing a character string and/or a figure based on the input drawing instruction is widely known and thus detailed description thereof will be omitted.

The image-element storing section 22 may acquire, from a clock section (not shown), date-and-time information indicating drawing time when the vector information is stored in the storage section 12 and may record the acquired date-and-time information in association with the vector information.

That is, as shown in FIG. 3, the image element identifiers (ID), the vector information (V), and the date-and-time information (T) are stored in the storage section 12 in association with each other.

The image output section 23 generates a display screen in which the image elements stored in the storage section 12 are drawn and outputs the generated display screen to the display section 14. The transformation-target receiving section 24 receives an instruction operation to select a part of the image elements drawn in the display screen and sets the selected image element(s) as a transformation target. For example, the transformation-target receiving section 24 specifies an image element that is drawn in a position where a click operation is performed by the mouse or the like, and sets the specified image element as a transformation target.

The transformation operation receiving section 25 receives a processing instruction including transformation of an image element (image elements). Examples of this process include rotation of the image element(s) and change of an arrangement direction of a character string (change from horizontal writing to vertical writing, etc.), as well as change of a size of the image element(s).

The image element relation setting section 26 reserves, in the storage section 12, an area for storing a drawing plane (may be referred to as "object plane"). The object plane may be lower in resolution than the display screen. For example, when the display screen has 800×600 pixels, the object plane may be a pixel group of 100×75 pixels.

Figure 4:
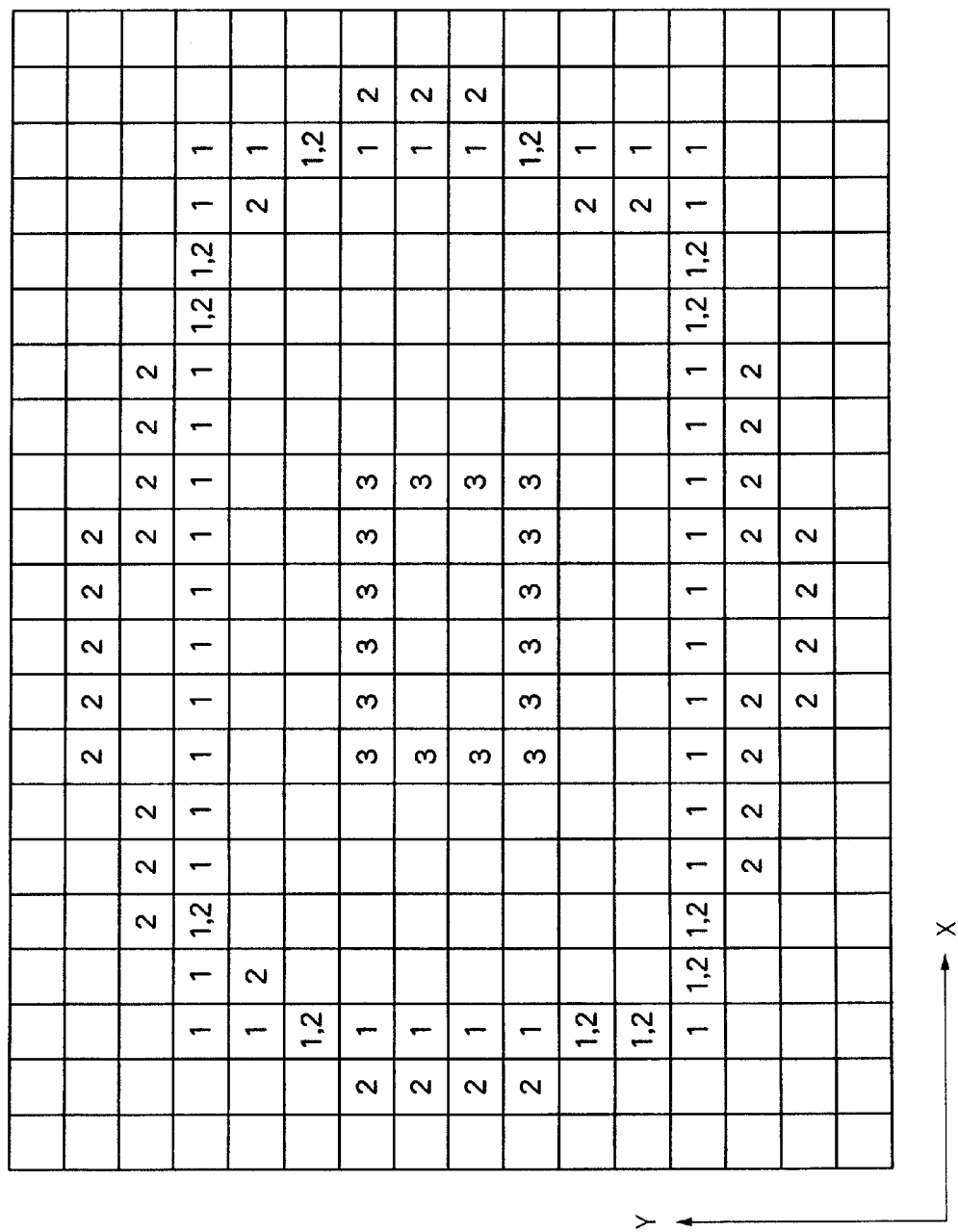
FIG. 4 is a diagram illustrating an example of an object plane in a processing example of the image processing apparatus according to the exemplary embodiment of the invention.

The image element relation setting section 26 draws the image elements on the object plane based on the image elements stored in the storage section 12. At this time, values of pixels of an image element having X in image element identifier are set to X, regardless of colors designated by the image element. When figures of plural image elements are drawn in the same pixel, the image element identifiers of the plural image elements are recorded in the pixel. Accordingly, for example, when (1) an image element E1 having an image element identifier of "1" and having a rectangular shape,
(2) an image element E2 having an image element identifier of "2" and having an elliptical shape, and
(3) an image element E3 having an image element identifier of "3" and being surrounded with the ellipse of the image element E2 are stored in the storage section 12, an image shown in FIG. 4 is drawn on the object plane.

The image element relation setting section 26 extracts one line of the object plane in a main scanning direction (for example, from left to right). Then, the image element relation setting section 26 selects one of the image elements stored in the storage section 12 as an element in question (it is assumed that Op[i] denotes an image element identifier of the i-th selected element in question). While scanning the extracted line with assumption that the leftmost pixel is the 0-th pixel, the image element relation setting section 26 searches for pixels having the image element identifier Op[i] of the element in question. Whenever the image element relation setting section 26 finds a pixel having a pixel value of Op[i], the image element relation setting section 26 accumulates and records a position of the found pixel ("x" if the found pixel is the x-th pixel from the left end). Hereinafter, a position of a k-th recorded pixel is referred to as R[i,k].

The image element relation setting section 26 prepares the records R[i, k] (k=1, 2, . . . ) and then extracts a pair of an odd number record R[i, 2n−1] (n=1, 2, . . . ) and an even number record R[i, 2n] (k=1, 2, . . . ) subsequent thereto. When there is no even number record subsequent to the odd number record, the extraction is not performed.

The above-described process is performed on the image elements stored in the storage section 12 while selecting each image element as an element in question.

The image element relation setting section 26 performs the above-described process on the line p-th extracted from the uppermost line in the object plane. If a set of i and j (where i≠j) that satisfies $$R[i,2n-1]<R[j,2m-1]<R[j,2m]<R[i,2n]$$

exists in the extracted records, the image element relation setting section 26 temporarily determines that the image element of Op[j] is included in the image element of Op[i] and records information indicating that the image element of Op[j] is included in the image element of Op[i] in association with a value p identifying the line.

The image element relation setting section 26 performs the above-described process on all the lines of the object plane. If the information indicating that the image element of Op[j] is included in the image element of Op[i] is recorded and if the information indicating that the image element of Op[i] is included in the image element of Op[j] is not recorded, the image element relation setting section 26 records information indicating that the image element of Op[j] is included in the image element of Op[i].

If both of (a) the information indicating that the image element of Op[j] is included in the image element of Op[i] and (b) the information indicating that the image element of Op[i] is included in the image element of Op[j] are recorded, the image element relation setting section 26 records information indicating that the image element of Op[j] and the image element of Op[i] intersect each other.

Figures 5, 6:
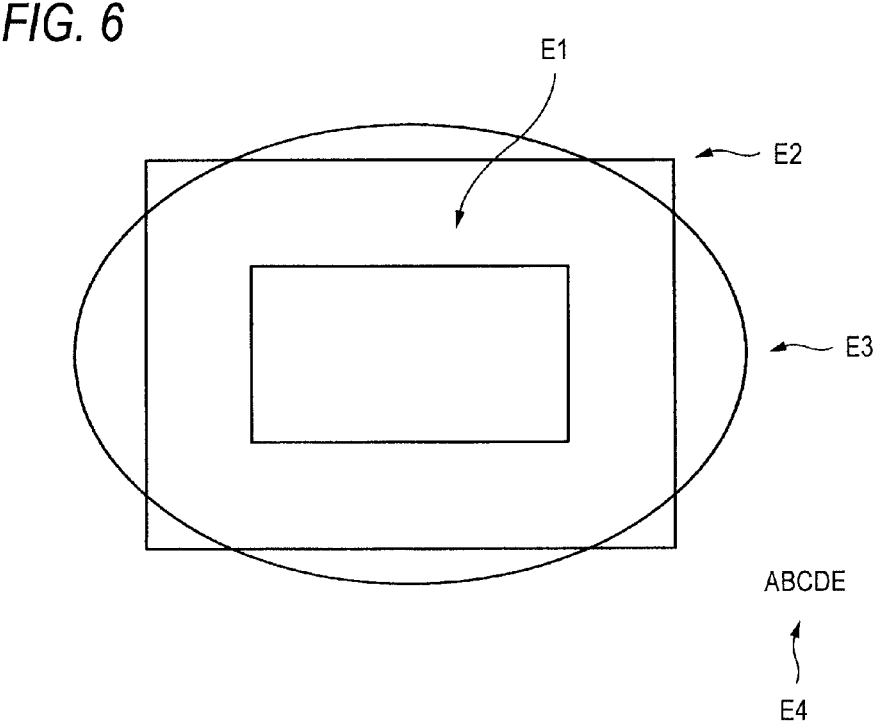
FIG. 5 is a diagram illustrating an example of an image element relation table generated by the image processing apparatus according to the exemplary embodiment of the invention.
FIG. 6 is a diagram illustrating an example of image elements that can be drawn by the image processing apparatus according to the exemplary embodiment of the invention.

This recording may generate an image element relation table that stores an image element identifier included in each image element identifier and an image element identifier intersecting each image element identifier in association with each image element identifier (see FIG. 5).

For example, in the object plane shown in FIG. 4, since a pixel having an image element identifier of "1" is located on the line of p=5, the 3rd and 19th positions, R[1, 1]=3 and R[1, 2]=19 are obtained. Also, R[2, 1]=4 and R[2, 2]=18 are obtained ob this line. Accordingly, if i=1 and j=2, R[i, 2n−1] <R[j, 2m−1]<R[j, 2m]<R[i, 2n] is satisfied and temporary information indicating that the image element having the image element identifier "2" is included in the image element having the image element identifier of "1" is recorded in association with p=5.

However, R[1, 1]=3, R[1, 2]=19, R[2, 1]=2, and R[2, 2]=20 on the line of p=7. If i=2 and j=1, R[i, 2n−1]<R[j, 2m−1]<R[j, 2m]<R[i, 2n] is satisfied. Accordingly, temporary information indicating that the image element having the image element identifier of "1" is included in the image element having the image element identifier of "2" is recorded in association with p=7. The image element relation setting section 26 determines that the image element having the image element identifier of "1" and the image element having the image element identifier of "2" intersect each other because both of (a) the temporary information indicating that the image element having the image element identifier "2" is included in the image element having the image element identifier of "1" and (b) the temporary information indicating that the image element having the image element identifier of "1" is included in the image element having the image element identifier of "2" are recorded.

On the other hand, in the lines from p=7 to p=10, when i=1 or 2 and j=3, R[i, 2n−1]<R[j, 2m−1]<R[j, 2m]<R[i, 2n] is satisfied and the other records do not exist. Accordingly, the image element relation setting section 26 determines that the image element having the image element identifier of "1" or "2" includes the image element having the image element identifier of "3".

Instead of the determination of intersection or in combination the determination of intersection, for example, if a certain pixel in which plural image element identifiers are recorded is included in the object plane, the image element relation setting section 26 may determine that the image elements identified by the plural image element identifiers recorded in the certain pixel intersect each other.

The image element relation setting section 26 may perform the above-described processes whenever a user gives a drawing instruction.

The search section 27 receives an image element identifier of the image element, which is set as a transformation target by the transformation-target receiving section 24. Then, the search section 27 searches the image element relation table shown in FIG. 5 for an image element included in the image element specified by the received image element identifier or an image element intersecting the image element specified by the received image element identifier. Then, the search section 27 outputs the search result to the transformation processing section 28.

Even if a pair of image elements are recorded as the image elements intersecting each other but a difference in size between the image elements of the pair is greater than a predetermined threshold value, the search section 27 may consider such image elements as image elements not intersecting each other and exclude such image elements from the search result.

If the image element relation setting section 26 determines the pair of image elements as image elements intersecting each other but the difference in size between the image elements of the pair is greater than a predetermined threshold value, the image element relation setting section 26 may consider such image elements not intersecting each other but may not record such image elements in the image element relation table.

Furthermore, even if a pair of image elements is recorded as ones intersecting or being included, the search section 27 may refer to the drawing time of the image elements and exclude the image elements, which are subjected to the drawing operation with a time gap greater than a predetermined threshold value, from the search result.

The transformation processing section 28 performs a transformation process on (i) the image element set by the transformation-target receiving section 24 and (ii) the image element specified by the search result output from the search section 27 based on the transformation instruction received by the transformation operation receiving section 25.

Next, an operation of the image processing apparatus 1 according to this exemplary embodiment will be described below. A user operates the input section 13 of the image processing apparatus 1 to input a character (characters) and/or a figure (figures). For example, it is assumed that a first rectangle is first drawn, a second rectangle surrounding the first rectangle is then drawn, an ellipse intersecting the second rectangle is drawn, and a character string is recorded in a position apart therefrom (see FIG. 6). In this case, (1) an image element E1 (first rectangle) having an image element identifier of "1" and having a rectangular shape;
(2) an image element E2 (second rectangle) having an image element identifier of "2" and having a rectangular shape surrounding the image element E1;
(3) an image element E3 having an image element identifier of "3" and having an elliptical shape surrounding the image element E1 and intersecting the image element E2; and
(4) an image element E4 having an image element identifier of "4" and having a character string not having any inclusion or intersection relation with the above-described image elements E1 to E3 are recorded along with the drawing time thereof.

Figure 7:
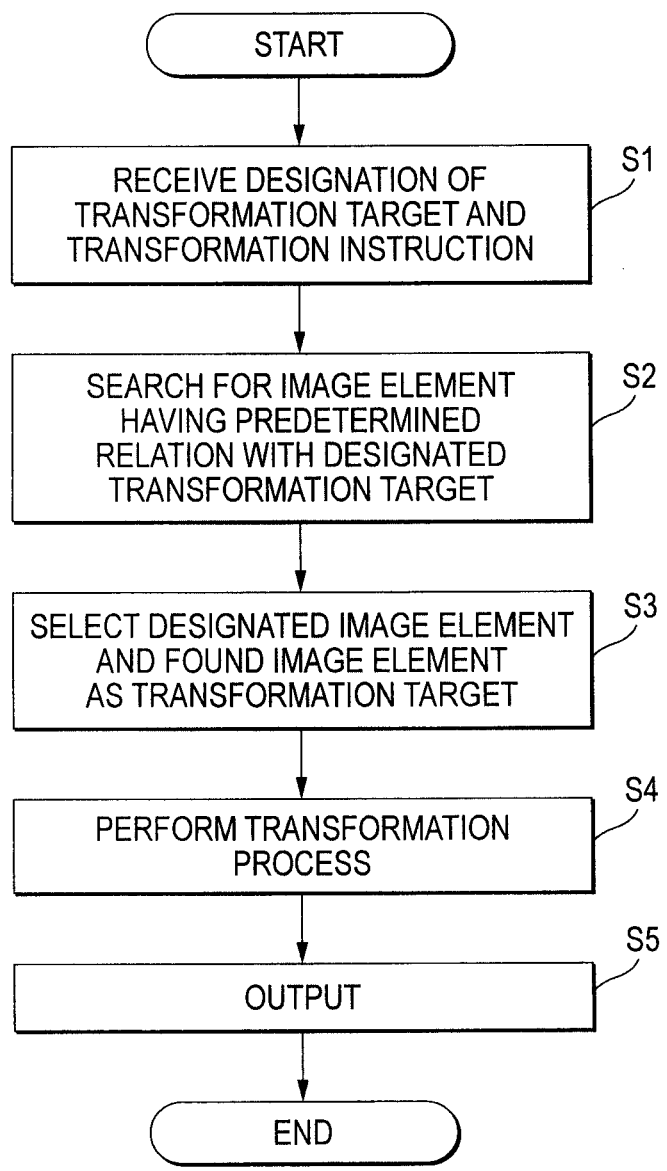
FIG. 7 is a flowchart illustrating an operation of the image processing apparatus according to the exemplary embodiment of the invention.

When a user selects the second rectangle to change the shape of the second rectangle (image element E2), the image processing apparatus 1 operates as follows. As shown in FIG. 7, when receiving a transformation instruction to transform the second rectangle (S1), the image processing apparatus 1 searches image elements stored in the storage section 12 for an image element that (i) has a relation, being based on a predetermined condition, with the second rectangle and (ii) is not a target of the transformation instruction (S2).

Here, as described above, the image element intersecting the second rectangle or included in the second rectangle is searched for. Then, the first rectangle of the image element E1 and the ellipse of the image element E3 are found as a search result.

The image processing apparatus 1 selects the first rectangle and the ellipse, which are found by the search, as the transformation target as well as the second rectangle designated as the transformation target (S3). Then, the image processing apparatus 1 performs a transformation process in accordance with the user's instruction (S4). For example, when an enlargement or reduction operation is performed on the image element E2 with a point designated by the user being used as enlargement/reduction center, the image processing apparatus 1 performs the transformation process so as to perform the enlargement or reduction operation on the image elements E1 and E3 with the same point being used as the enlargement/reduction center. The image processing apparatus 1 displays the transformed image elements on the display section 14 (S5).

Figure 8:
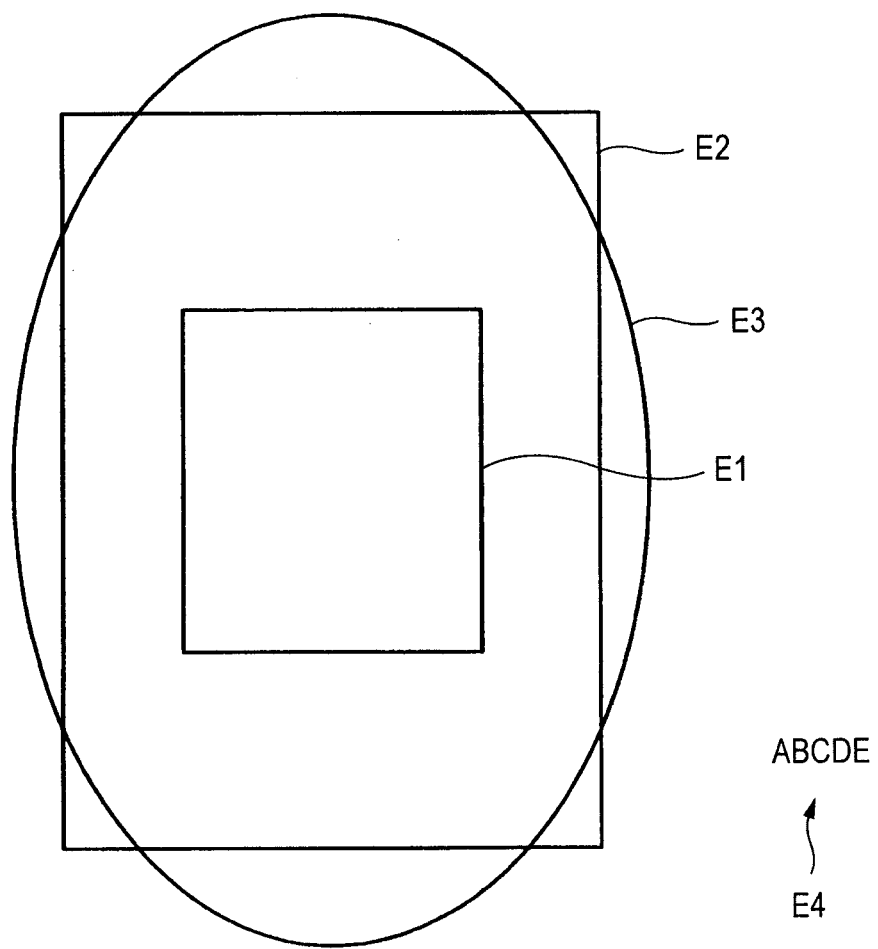
FIG. 8 is a diagram illustrating an example of image elements that have been transformed by the image processing apparatus according to the exemplary embodiment of the invention.

Accordingly, for example, when the user performs a twice enlargement operation in the vertical direction on the target, the image elements E1, E2 and E3 are enlarged twice in the vertical direction and the image element E4 is not transformed as shown in FIG. 8.

The image elements may be transformed in a method that is defined in advance for each figure indicated by the image element. For example, in the Bezier curve, a position of a control point may be moved in accordance with an enlargement or reduction ratio. For example, it is assumed that the coordinate of the control point is (Cx, Cy) and that the coordinate of the position designated as the center point of the enlargement/reduction is (Px, Py). If the enlargement/reduction ratio is n, the position of a new control point is (C'x, C'y)=(Px, Py)+η{(Cx, Cy)−(Px, Py)}.

Also, virtual lattice points may be arranged in the coordinate system in which the image elements are arranged. It is assumed that the coordinates of the lattice points C(Cx, Cy) is moved to a new position (C'x, C'y)=(Px, Py)+η{(Cx, Cy)−(Px, Py)}, similarly to the above-described control point. In this case, the control points may be moved by the same distance (C'x, C'y)−(Cx, Cy) where (Cx, Cy) is the lattice point closest to the control point Although it has been described that the image elements to be subjected to the transformation process are input through the input section 13 of the image processing apparatus 1 and the image elements are displayed on the display section 14, the invention is not limited thereto. Information of the image elements may be input or a transformation instruction may be received through a communication unit such as networks. Similarly, the image elements may be displayed on an external device connected through the communication unit.

The transformation operation is not limited to one performed by a user in an explicit manner. Even if a size is changed by another operation such as an operation of changing a horizontal writing of a character string to a vertical writing, another image element having a predetermined relation (intersection or inclusion) with the image element of the character string may be searched for and the found image element may be changed in size at the same ratio as the change in size of the character string.

According to the image processing apparatus 1 of this exemplary embodiment, it is possible to reduce damage in relative positions between figures to be correlated with each other, as compared with the case not having the configuration according to this exemplary embodiment.

What is claimed is:

1. An image processing apparatus comprising:
    a storage unit that stores information of a plurality of drawn image elements;
    a transformation-target receiving unit that sets a first image element as a transformation target, the first image element is specified by an instruction operation to select one of the image elements drawn in a display screen as a transformation target;
    a receiving unit that receives a transformation instruction to transform the first image element set by the transformation-target receiving unit;
    a search unit that searches the storage unit for a second image element that (i) has a relation, being based on a predetermined condition, with the first image element, which is a target of the transformation instruction, and (ii) is not the transformation target;
    a processing unit that performs a transformation process on both of the first image element which is the target of the received transformation instruction, and the second image element which is found as the search result, based on the received transformation instruction; and
    an output unit that outputs the result of the transformation process.

2. The image processing apparatus according to claim 1, wherein the search unit searches the storage unit for the second image element, which (i) has such a relation with the first image element being the target of the transformation instruction that at least a part of the second image element overlaps with the first image element, which is the target of the transformation instruction, as the relation being based on the predetermined condition and (ii) is not the transformation target.

3. The image processing apparatus according to claim 1, wherein the search unit searches the storage unit for the second image element, which has (i) such a relation that the second image element is surrounded by the first image element which is the target of the transformation instruction, as the relation being based on the predetermined condition and (ii) is not the transformation target.

4. The image processing apparatus according to claim 2, wherein the search unit searches the storage unit for the second image element, which has (i) such a relation that the second image element is surrounded by the first image element which is the target of the transformation instruction, as the relation being based on the predetermined condition and (ii) is not the transformation target.

5. The image processing apparatus according to claim 1, wherein
    the storage unit stores information relating to drawing date and time for each image element, and
    the search unit searches the storage unit for the second image element, which (i) has a relation being based on a condition including a condition relating to a condition of drawing date and time as the predetermined condition and (ii) is not the transformation target.

6. The image processing apparatus according to claim 2, wherein
    the storage unit stores information relating to drawing date and time for each first image element, and
    the search unit searches the storage unit for the second image element, which (i) has a relation being based on a condition including a condition relating to a condition of drawing date and time as the predetermined condition and (ii) is not the transformation target.

7. The image processing apparatus according to claim 3, wherein
    the storage unit stores information relating to drawing date and time for each first image element, and
    the search unit searches the storage unit for the second image element, which (i) has a relation being based on a condition including a condition relating to a condition of drawing date and time as the predetermined condition and (ii) is not the transformation target.

8. The image processing apparatus according to claim 4, wherein
    the storage unit stores information relating to drawing date and time for each first image element, and
    the search unit searches the storage unit for the second image element, which (i) has a relation being based on a condition including a condition relating to a condition of drawing date and time as the predetermined condition and (ii) is not the transformation target.

9. An image processing method comprising:
    setting a first image element as a transformation target, the first image element is specified by an instruction operation to select one of a plurality of image elements drawn in a display screen as a transformation target;
    receiving a transformation instruction to transform the first image element set, wherein information of the plurality of image elements is stored in a storage unit;
    searching the storage unit for a second image element that (i) has a relation, being based on a predetermined condition, with the first image element, which is a target of the transformation instruction, and (ii) is not the transformation target;

performing a transformation process on both of the first image element which is the target of the received transformation instruction, and the second image element which is found as the search result, based on the received transformation instruction; and outputting the result of the transformation process.

10. The method according to claim 9, wherein the searching searches the storage unit for the second image element, which (i) has such a relation with the first image element which is the target of the transformation instruction that at least a part of the second image element overlaps with the first image element, which is the target of the transformation instruction, as the relation being based on the predetermined condition and (ii) is not the transformation target.

11. The method according to claim 9, wherein the searching searches the storage unit for the second image element, which has (i) such a relation that the image element is surrounded by the first image element which is the target of the transformation instruction, as the relation being based on the predetermined condition and (ii) is not the transformation target.

12. The method according to claim 10, wherein the searching searches the storage unit for the second image element, which has (i) such a relation that the image element is surrounded by the first image element which is the target of the transformation instruction, as the relation being based on the predetermined condition and (ii) is not the transformation target.

13. A non-transitory computer-readable medium storing a program that causes a computer to execute image processing, the image processing comprising:

setting a first image element as a transformation target, the first image element is specified by an instruction operation to select one of a plurality of image elements drawn in a display screen as a transformation target;

receiving a transformation instruction to transform the first image element set, wherein information of the plurality of image elements is stored in a storage unit;

searching the storage unit for a second image element that (i) has a relation, being based on a predetermined condition, with the first image element, which is a target of the transformation instruction, and (ii) is not the transformation target;

performing a transformation process on both of the first image element which is the target of the received transformation instruction, and the second image element which is found as the search result, based on the received transformation instruction; and outputting the result of the transformation process.

14. The non-transitory medium according to claim 13, wherein the searching searches the storage unit for the second image element, which (i) has such a relation with the first image element which is the target of the transformation instruction that at least a part of the second image element overlaps with the first image elements, which are the target of the transformation instruction, as the relation being based on the predetermined condition and (ii) is not the transformation target.

15. The non-transitory medium according to claim 13, wherein the searching searches the storage unit for the second image element, which has (i) such a relation that the second image element is surrounded by the first image element which is the target of the transformation instruction, as the relation being based on the predetermined condition and (ii) is not the transformation target.

16. The non-transitory medium according to claim 14, wherein the searching searches the storage unit for the second image element, which has (i) such a relation that the second image element is surrounded by the first image element which is the target of the transformation instruction, as the relation being based on the predetermined condition and (ii) is not the transformation target.

17. The image processing apparatus according to claim 1, wherein the transformation process is an enlargement operation.

18. The image processing apparatus according to claim 1, wherein the transformation process is a reduction operation.

19. The image processing apparatus according to claim 17, wherein the enlargement operation is performed with a point, designated in the transformation instruction, as an enlargement center.

20. The image processing apparatus according to claim 18, wherein the reduction operation is performed with a point, designated in the transformation instruction, as a reduction center.

21. The image processing apparatus according to claim 1, wherein the image elements are characters.

22. The image processing apparatus according to claim 1, wherein the image elements are figures.

23. The image processing apparatus according to claim 1, wherein the second image element is a character.

24. The image processing apparatus according to claim 1, wherein the second image element is a figure.

25. The image processing apparatus according to claim 1, wherein the transformation process is an enlargement operation, and the enlargement operation occurs in at least one of a horizontal direction and a vertical direction.

26. The image processing apparatus according to claim 1, wherein the transformation process is a reduction operation, and the reduction operation occurs in at least one of a horizontal direction and a vertical direction.

* * * * *